(12) United States Patent
Stampfer

(10) Patent No.: US 6,348,511 B1
(45) Date of Patent: Feb. 19, 2002

(54) METHOD AND DEVICE FOR MULTIFOAMING OF EXPANDABLE PLASTICS

(75) Inventor: Hans Reiner Stampfer, Landskron (AT)

(73) Assignee: Hirach Maschinenbau GmbH & Co. KG., Glanegg (AT)

( * ) Notice: Subject to any disclaimer, the term of this patent is extended or adjusted under 35 U.S.C. 154(b) by 0 days.

(21) Appl. No.: 09/391,527

(22) Filed: Sep. 8, 1999

(30) Foreign Application Priority Data

Jul. 13, 1999 (AT) ............................................. 477/99 U

(51) Int. Cl.$^7$ .................................................. C08J 9/22
(52) U.S. Cl. ........................................... 521/58; 264/55
(58) Field of Search ................................ 54/58; 264/55

(56) References Cited

U.S. PATENT DOCUMENTS

| | | | | | |
|---|---|---|---|---|---|
| 3,126,432 | A | * | 3/1964 | Schuur | 521/58 |
| 4,485,193 | A | * | 11/1984 | Rubens et al. | 521/58 |
| 4,504,601 | A | * | 3/1985 | Kuwabara et al. | 521/58 |
| 4,925,606 | A | * | 5/1990 | Francis | 521/58 |
| 5,773,481 | A | * | 6/1998 | Fischer et al. | 521/58 |

* cited by examiner

*Primary Examiner*—Morton Foelak
(74) *Attorney, Agent, or Firm*—Jacobson Holman, PLLC

(57) ABSTRACT

A process for multifoaming expendable plastics, such as, for instance, EPS, EPE, EPP or polymer mixtures, wherein prefoaming is effected in a first step and after foaming of already prefoamed material is effected in at least one further step. The process also provides that discontinuous or batchwise foaming is carried out as final afterfoaming.

8 Claims, 1 Drawing Sheet

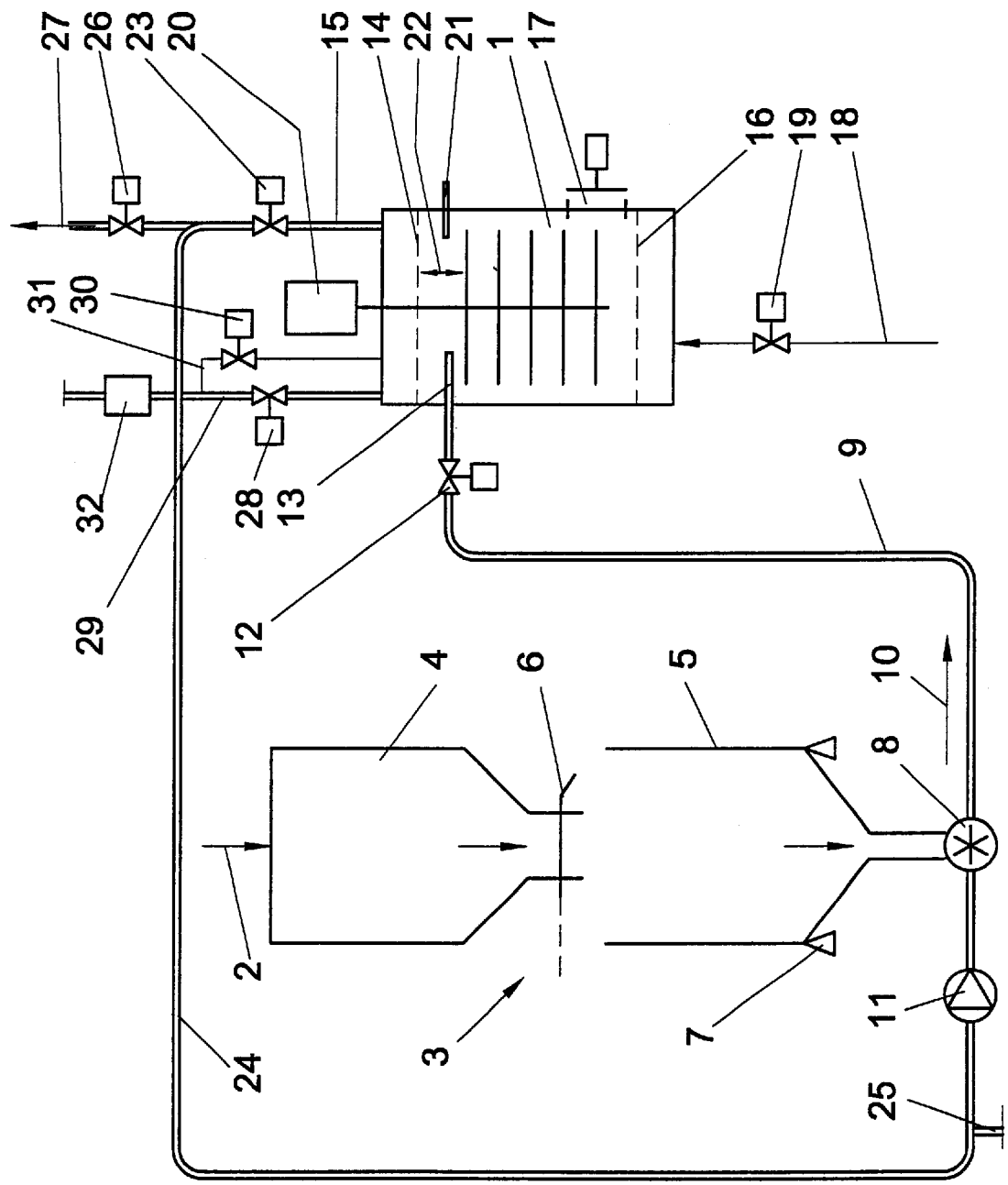

METHOD AND DEVICE FOR MULTIFOAMING OF EXPANDABLE PLASTICS

BACKGROUND OF THE INVENTION

1. Field of the Invention

The present invention relates to a process for multifoaming expandable plastics, such as, for instance, EPS, EPE, EPP or polymer mixtures, with prefoaming being effected in a first step and afterfoaming of already prefoamed material being effected in at least one further step, as well as a device for afterfoaming expandable plastics, such as, for instance, EPS, EPE, EPP or polymer mixtures, prefoamed in at least one prefoaming stage.

2. Prior Art

In the context of foaming expandable plastics such as, for instance, EPS, EPE, EPP or polymer mixtures, it is known to foam such plastics to different desired bulk densities in continuous or discontinuous or batchwise foaming procedures in one stage or process step. When realizing a single foaming procedure or providing a single foaming stage, it is merely feasible to reach a limited bulk density. The expandable plastic is comprised of a thermoplastic and an embedded low-boiling hydrocarbon compound as a blowing agent, wherein heating, for instance by feeding water vapor for foaming, not only causes heating of the expandable plastic but also an increase in the volume and hence an accordingly low bulk density by the vapor pressure of the blowing agent rising.

In case lower bulk densities than those obtainable in a single foaming procedure are to be reached, it is, moreover, known to effect afterfoaming of an already prefoamed, optionally deposited material, in at least one further step, wherein continuous foaming procedures and foaming devices are known for such afterfoaming in order to attain the desired low bulk densities.

In connection with processes for foaming expandable plastics, there are, however, partially restrictive conditions imposed on account of increasingly tightened environmental regulations, which refer to the blowing agent content of expandable plastics or the releasable content of blowing agent contained in the offgas after having carried out an optionally multistage foaming procedure. In general, a relatively high portion or content of blowing agent is, however, required for the realization of continuously operating foaming procedures such that even with several foaming procedures optionally desired very low bulk densities cannot be attained, or only by employing complex and extensive additional means for purifying offgases drawn off the foaming procedures, within the context of a final continuous afterfoaming procedure.

SUMMARY OF THE INVENTION

The present invention aims at providing a process and a device for multifoaming or afterfoaming expandable plastics according to the initially defined kind, by which it is feasible to selectively attain very low bulk densities even by complying with strict environmental conditions.

To solve these objects, the process according to the invention for multifoaming expandable plastics is essentially characterized in that discontinuous or batchwise foaming is carried out as final afterfoaming. Due to the fact that, according to the invention, discontinuous or batchwise foaming is carried out as final afterfoaming, it is feasible to do with comparatively lower contents of blowing agent so as to readily comply with tight environmental conditions relating to the blowing agent portion contained in gases drawn off such a discontinuous or batchwise foaming procedure. By applying such discontinuous or batchwise afterfoaming, it is, moreover, feasible to attain also very low bulk densities, in particular considerably lower bulk densities than with continuous afterfoaming, wherein discontinuous or batchwise afterfoaming may be carried out also with precisely adjustable process parameters in respect of the bulk density to be attained and even for large volumes within a short time.

In order to attain or maintain precisely definable bulk densities upon completion of the afterfoaming procedure substantially independently of the bulk density of the at least once prefoamed material, it is proposed according to a further preferred embodiment of the process according to the invention that the prefoamed material is subjected to a weighing process prior to being introduced into final afterfoaming. By providing such a weighing process, it is feasible, in a manner precisely adapted to the bulk density to be attained and independent of the bulk density of the prefoamed material, to provide for said final discontinuous or batchwise afterfoaming an accordingly precisely defined amount of the at least once prefoamed material such that an accordingly precisely attained bulk density is ensured upon completion of the afterfoaming procedure.

In order to enable the rapid introduction of large filling amounts of already prefoamed material for carrying out the afterfoaming procedure, it is provided according to another preferred embodiment that the prefoamed material is introduced into a vessel for afterfoaming, using a closed-loop fluid conveying circuit. Such an introduction using a closed-loop fluid conveying circuit allows for short charging times of a vessel for discontinuous or batchwise afterfoaming, wherein blowing and sucking by means of a blower is effected simultaneously within said closed-loop fluid conveying circuit.

As already indicated above, it is necessary on account of increasingly tightened environmental regulations that the content of blowing agent contained in the offgases from the foaming stage be reduced to predetermined maximum limit values. In order to readily reduce the offgas to be given off by the foaming vessel, and the blowing agent contained therein, it is proposed according to a further preferred embodiment that offgas drawn off the final afterfoaming stage is at least partially recycled for conveying the prefoamed material into the afterfoaming stage. In that manner, a blowing agent content ranging within the permitted limit values can be selectively released to the environment and smaller dimensioned and hence simpler offgas purification means will do.

In order to obtain the desired end product, or the desired bulk density, it is, moreover, suggested that said final afterfoaming is carried out by introducing water vapor, optionally under the addition of air, at a pressure of 1 bar to 7 bars, in particular about 1.05 bar to 2 bars, at a temperature of from 75° C. to 160° C., in particular about 100° C., as in correspondence with a further preferred embodiment of the process according to the invention. By observing the parameters indicated according to the invention in respect of the pressure and temperature to be applied in afterfoaming, the desired low bulk density may be guaranteed within a short period of time even for large batches, using, for instance, saturated vapor or slightly superheated vapor.

In order to obtain a homogenously expanded end product or a product having a homogenous bulk density, it is, moreover, suggested in a preferred manner that the material during afterfoaming is stirred under the continuous supply of water vapor.

To solve the above objects, it is, furthermore, provided according to the invention, for a device for afterfoaming expandable plastics, such as, for instance, EPS, EPE, EPP or polymer mixtures, prefoamed in at least one prefoaming stage, that it comprises at least one storage or supply means and a foaming vessel for a discontinuous or batchwise afterfoaming of the prefoamed expandable plastics. In this manner, the discontinuous or batchwise afterfoaming provided according to the invention may be carried out by means of a simple construction, wherein, in this respect, essentially a known foaming vessel for discontinuous or batchwise foaming including only slight modifications adapted to the purpose of use of the foaming vessel according to the invention for subsequent afterfoaming may be employed. In this context, it is, moreover, suggested that the foaming vessel, besides a feed opening for water vapor, a discharge duct for the foamed material and at least one offgas exhaust opening, comprises a tangentially connected blow-in opening for the prefoamed material and a sieve in the upper part of the foaming vessel as in correspondence with a further preferred embodiment of the device according to the invention. By providing a tangentially connected blow-in opening for the prefoamed material with an additional sieve in the upper part of the foaming vessel, rapid filling of the foaming vessel with the already prefoamed material already having a comparatively large volume is feasible in the desired quantity.

In order to enable precise proportioning of the prefoamed material aimed at attaining adjustable desired bulk densities, it is provided according to another preferred embodiment that a weighing means for the prefoamed material is integrated in the storage or supply means. Such a weighing means may be directly integrated in the storage or supply means, such weighing resulting in an accordingly good repeatability of the subsequent afterfoaming procedure and the thus attainable bulk density. In doing so, the weighing procedure as well as the following process conduct may be accordingly monitored and controlled by an electronic program scheduler.

In order to ensure the rapid and reliable introduction of the, in particular, previously weighed prefoamed material into the foaming vessel, it is provided according to a further preferred embodiment that a cellular wheel sluice or feeder is connected to the storage or supply means and that a blower is provided for introducing the prefoamed material into the foaming vessel. Such a cellular wheel sluice enables reliable proportioning from the storage or supply means after passage of the weighing means and the blower enables an accordingly rapid and safe introduction of the prefoamed material into the afterfoaming vessel.

In order to reach accordingly low blowing agent contents in the offgas, it is provided by the invention, according to another preferred embodiment, that a recycling duct for offgas drawn off the foaming vessel is connected to the foaming vessel for an at least partial recirculation of the offgas to the foaming vessel via the blower while forming a closed-loop conveying circuit for the introduction of the prefoamed material. By such an at least partial recirculation, it is feasible to not only do with accordingly small amounts of gas to be additionally fed for introducing the foamed material into the foaming vessel, but also avoid excessive loads on the environment. In this context, it is, moreover, provided by the invention, according to a further preferred embodiment, that an offgas purification plant is provided in an exhaust duct, whereby the arrangement of said recycling duct and said closed-loop fluid conveying circuit allows for accordingly smaller and simpler dimensioning of the offgas purification plant for reaching the specified offgas values.

Since the prefoamed material is subjected, in particular, to a weighing procedure prior to its introduction into the afterfoaming vessel in order to thereby enable precise apportioning of the prefoamed material aimed at attaining a desired bulk density, the foaming procedure or the attainment of the desired bulk density or volumes may be realized in the foaming vessel by simple means, to which end it is suggested that a filling level sensor or switch, which, in particular, is adjustable in height, is provided in the foaming vessel as in accordance with a further preferred embodiment of the device according to the invention. Such a filling level sensor or controller or switch, which, in particular, is adjustable in height, for instance, by adjustment enables simple adaptation to the bulk densities or volumes to be attained such that, for instance, for a wide range of bulk densities to be attained, the supplied and, in particular, weighed quantity of prefoamed material may be kept substantially equal and the precise adaptation to the desired bulk density is feasible within narrow tolerances merely by simply adjusting the filling level sensor or switch.

In order to ensure a uniform afterfoaming procedure, in particular when continuously blowing in water vapor during the foaming procedure, it is, moreover, preferably provided according to the invention that a stirring means is integrated in the foaming vessel, such a stirring means enabling the homogenous agitation of the afterfoaming material present in the foaming vessel by the water vapor introduced.

BRIEF DESCRIPTION OF THE DRAWING

In the following, the invention will be explained in more detail by way of an exemplary embodiment of a device according to the invention for carrying out the process according to the invention for multifoaming expandable plastics, which is schematically illustrated in the accompanying drawing.

DETAILED DESCRIPTION OF A PREFERRED EMBODIMENT OF THE INVENTION

In the Figure, 1 generally denotes a foaming vessel for carrying out final discontinuous or batchwise foaming of an expandable plastic already prefoamed at least once, such as, for instance, EPS, EPE, EPP or polymer mixtures. The material already prefoamed at least once is supplied to a storage or supply means generally denoted by 3 according to arrow 2, said storage or supply means being comprised of an apportioning silo denoted by 4 and a consecutively arranged weighing means denoted by 5. In the region of the discharge opening from the apportioning silo 4, an apportioning means 6 is schematically provided, which is controlled, for instance, electronically and formed by a coarse and fine metering slide, whereby the prefoamed material is fed to the weighing means 5 via that apportioning means 6, the weighing elements being schematically indicated by 7. At the discharge from the weighing means 5 is provided a cellular wheel sluice or feeder denoted by 8, which opens into a supply duct 9 for conveying the weighed prefoamed material from the weighing means 5 into the foaming vessel 1 according to arrow 10, wherein the prefoamed material is introduced into the afterfoaming vessel 1 by using a blower 11, wherein a safety valve 12, in addition, immediately precedes the foaming vessel 1.

In order to enable rapid and proper filling of the foaming vessel 1, the duct 9 opens into a tangential inlet socket 13 provided at the foaming vessel 1, with a sieve 14 being additionally provided in the upper part of the foaming vessel 1 in order to prevent the prefoamed material from escaping from the foaming vessel 1 and getting into the exhaust duct 15. A bottom sieve 16 is indicated on the bottom of the foaming vessel 1, wherein a discharge opening 17 for discharging the afterfoamed material after having carried out the discontinuous or batchwise afterfoaming procedure is provided immediately above the bottom sieve.

Discontinuous or batchwise afterfoaming is effected by feeding vapor through the feed duct 18 via a controlling means or a valve 19 provided in the bottom region of the foaming vessel 1, wherein stirring of the introduced prefoamed material is effected by means of a schematically indicated stirring means 20 simultaneously with the feeding of vapor. The attainment of the desired bulk density is monitored by a filling level sensor or switch 21 which, for instance for adjusting different bulk densities or volumes, is adjustable, in particular, in the height direction as indicated by arrow 22.

In order to attain the desired bulk density within accordingly short periods of time, the vapor, optionally upon admixture of air, is introduced at a pressure of approximately 1 to 2 bars as well as a temperature of approximately 75 to 160° C., the residence time of the prefoamed material for attaining the desired bulk density being about 1 to 2 minutes in the foaming vessel 1.

Excess vapor used for expansion as well as blowing agent escaping from the material to be expanded are drawn off the foaming vessel 1 via the exhaust 15, a further control or valve means 23 being provided to this end. That valve or slide 23 is followed by a recycling duct 24 leading to the blower 11 so as to provide an altogether closed-loop fluid conveying circuit for introducing prefoamed material into the vessel 1. For controlling the fluid within the recycling duct 24, a valve or slide 26 is, furthermore, provided, which leads into an exhaust means 27 or a consecutively arranged blowing agent disposal plant. In that case, the blower 11 is fed with fresh air via an additional air supply opening 25 preceding the same.

After having introduced the batch into the vessel 1, the slides or valves 12 and 23 as well as optionally 25 are closed and expanding of the charged material takes place by means of vapor by feeding the same through the duct 18 and the valve or slide 19 under stirring by the stirring means 20 as far as to a level determined by the switch 21.

While vaporizing the material introduced into the vessel 1, a main aeration valve 28 in an offgas duct 29 remains closed and the offgas is introduced into the offgas duct or exhaust 29 via a small bypass valve 30 provided in a bypass duct 31. From the exhaust 29, discharging into the atmosphere or into an offgas purification plant or blowing agent disposal plant schematically indicated by 32 is effected. After having attained the desired volume or the desired bulk density, pressure is let off the vessel via a slide 28, whereupon the expanded material is removed from the vessel 1 through the discharge means 17 and, after this, a new cycle is started by introducing material from the weighing means 5 into the vessel 1.

Exemplary Embodiment

Prefoamed material, for instance EPS having a bulk density of 16 kg/m$^3$, is supplied to the apportioning means 4 and 32 kg of the prefoamed material are weighed by the weighing means 32 and subsequently introduced into the afterfoaming vessel 1 via the cellular wheel sluice 8.

By feeding water vapor at a temperature of 105° C. and a pressure of 1.2 bar, an increase in the volume of the charged prefoamed material to twice its volume is carried out after a treatment or residence time of about 1 min within the foaming vessel in order to attain a bulk density of 8 kg/$^3$. stirring of the charged material is effected by the commercially available stirring means 20 at 30 rpm under continuous water vapor feeding at a rate of 15 m$^3$/min. Afterfoaming of an expandable plastic in an afterfoaming procedure may, thus, be performed in the vessel having an effective volume of about 4.5 m$^3$.

I claim:

1. A process for multifoaming expanded polystyrene foam, wherein said process comprising:

a first step with prefoaming being effected; and at least one further step with afterfoaming of already prefoamed material being effected, wherein discontinuous or batchwise foaming is carried out as final afterfoaming.

2. The process according to claim 1, comprising a further step of:

subjecting the prefoamed material to a weighing procedure prior to being introduced into the final afterfoaming stage.

3. The process according to claim 1, comprising a further step of:

introducing the prefoamed material into a vessel for afterfoaming, using a closed-loop fluid conveying circuit.

4. The process according to claim 3, wherein offgas drawn off a final afterfoaming stage is at least partially recycled for conveying the prefoamed material into the afterfoaming stage.

5. The process according to claim 1, comprising a further step of:

carrying out final afterfoaming by introducing water vapor, optionally under the addition of air, at a pressure of 1 bar to 7 bars, and at a temperature of from 750 to 160° C.

6. The process according to claim 5, comprising a further step of:

stirring the material during afterfoaming under the continuous supply of water vapor.

7. The process according to claim 5, wherein said step of carrying out final afterfoaming by introducing water vapor is at the pressure 1.05 bars to 2.0 bars.

8. The process according to claim 5, wherein said step of carrying out final afterfoaming by introducing water vapor is at the temperature of 100° C.

* * * * *